United States Patent Office 3,285,864
Patented Nov. 15, 1966

3,285,864
PERMEABLE MICROPOROUS PLASTIC SHEET
AND THE METHOD OF MAKING THE SAME
Jerrold J. Abell, Putnam, and Kenneth J. Virkus, Willimantic, Conn., assignors to Rogers Corporation, Rogers, Conn., a corporation of Massachusetts
No Drawing. Filed May 8, 1963, Ser. No. 279,014
5 Claims. (Cl. 260—2.5)

This invention relates to a permeable microporous plastic sheet and the method of making the same.

The invention has for an object to provide a novel and improved relatively rigid permeable microporous plastic sheet which is characterized by having improved mechanical strength and increased heat resistance.

The invention has for a further object to provide a novel and improved method of making a relatively rigid permeable microporous plastic sheet having improved mechanical strength and heat resistance in a novel, efficient and economical manner.

It has long been known that permeable microporous resin sheets may be prepared by sintering a granular resin comprising a copolymer of vinyl chloride and vinyl acetate. In the patent to Berg et al., No. 2,371,868, it was proposed that this be accomplished by mixing the granular resin with material amounts of a plasticizer prior to sintering. This procedure, however, results in a product which is too flexible for many applications.

Granular copolymers of vinyl chloride and vinyl acetate having relatively high proportions of vinyl acetate can be sintered without the addition of a plasticizer to obtain a rigid sheet having suitable mechanical strength, but these polymers are so expensive that their use is greatly limited. Furthermore, these polymers have lower resistance to deformation at elevated temperatures than do low acetate copolymers. All attempts to employ copolymers of a high proportion of vinyl chloride, that is to say, those in which the vinyl chloride comprises at least 97% of the copolymer, have resulted in products which are so brittle and lacking in mechanical strength that they are of little use for any purpose.

It has been found, however, that, surprisingly, if a minor proportion, from 1–10 parts of an ethyl silicate is added to 100 parts of an unplasticized granular copolymer of low polyvinyl acetate content before sintering, there results a permeable microporous sheet which has improved mechanical strength and, in addition, results in a sheet having heat resistance superior to that of the high acetate materials. This same technique will also produce improved tensile strength with higher acetate content copolymers but in general is not necessary since these materials can be sintered to sheets with adequate strength for most applications without it. It has also been found that while tetraethyl ortho-silicate is preferred, other ethyl silicates, such as that manufactured by Union Carbide Chemicals Company under the trade name "Ethyl Silicate 40," and mixed ethyl silicates, such as ethyl polysilicates, may be used as will be hereinafter set forth in examples to follow.

Granular copolymers of vinyl chloride and vinyl acetate suitable for use in the practice of this invention are readily available on the open market. One such product is that known as "Vinylite VYNW," manufactured by Union Carbide Plastics Company. This product has a vinyl chloride content of 97%–98% and an average molecular weight of 24,000. It is preferred that the particle size of the granular resin be such that it will pass through a 40 mesh screen, and the commercial resin meets this qualification. The particle size can, of course, be varied, depending upon the pore size desired in the final product.

The ethyl silicate, which is a liquid, is easily mixed with the granular resin by conventional dry blending techniques.

After the granular copolymer and liquid ester have been thoroughly intermixed, the microporous sheets are formed by sintering under heat and pressure. The sintering may be carried out in a press in which the opposed platens are heated, but it is preferred that the sintered sheet be formed continuously by the process described in the patent to W. W. Yarrison, No. 3,067,469, which issued December 11, 1962.

As illustrative of the present invention, but not as limiting the same, there is set forth the following example of the preparation of a rigid permeable microporous resin sheet of improved mechanical strength and resistance to heat:

Example 1

100 parts of Vinylite VYNW were blended with 3 parts of tetraethyl orthosilicate in a high speed agitator, the blending being continued until the resin and liquid ester were thoroughly intermixed. The thoroughly blended resin particles and liquid ester were then formed into a permeable microporous sheet by sintering between resilient sheets in the manner disclosed by United States Patent No. 3,067,469. The sheet had a tensile strength of 350 p.s.i and was found to be particularly suitable for use as a separator in a storage battery cell. A similar sheet made without the use of tetraethyl orthosilicate had a tensile strength of only 250 p.s.i

Example 2

100 parts of Vinylite VYSH are blended with 1 part of mixed ethyl polysilicates. After sintering in a manner similar to Example 1, a tensile strength of 2470 p.s.i. was measured. A similar sheet without ethyl silicates had a tensile strength of 590 p.s.i.

The reason that ethyl silicate imparts improved mechanical strength to the microporous sheet is not known for certain, but may be due to hydrolysis products which are formed because slight amounts of moisture are inherently present.

The products of the present invention may be used in any application where a permeable microporous resin sheet of the rigid type is desired. One such application has already been mentioned, and this is the use of the sheet as a separator in a storage battery. It is particularly suitable for this purpose because of its resistance to acid or alkali and because, while the individual pores are very fine, the sheet as a whole is quite permeable to the passage of aqueous media. However, if a still greater wettability is desired, the finished sheets can be impregnated or coated with a wetting agent prior to use as a battery separator.

From the foregoing description of the present invention it will be apparent that the present invention provides a novel and improved permeable microporous plastic sheet and method of making the same in a highly efficient and economical manner wherein the sheet is characterized by improved mechanical strength, rigidity and heat resistance and is particularly adapted for use where such characteristics are desired or necessary.

Having described the invention, what is claimed is:

1. A permeable microporous sheet of sintered, non-plasticized granular resin, said resin being a copolymer essentially of 97% to 98% by weight of vinyl chloride and 2% to 3% by weight vinyl acetate, said sheet having its mechanical strength improved by the addition of an ethyl silicate to said resin.

2. A permeable microporous sheet as defined in claim 1 wherein the ethyl silicate comprises tetraethyl orthosilicate.

3. A permeable microporous sheet of sintered, nonplasticized granular resin, said resin being a copolymer essentially of 97% to 98% by weight of vinyl chloride and 2% to 3% by weight vinyl acetate, said sheet having its mechanical strength improved by the addition of 1–10 parts of ethyl silicate to 100 parts of said resin.

4. The method of preparing a permeable microporous sheet, comprising intimately mixing a granular copolymer essentially of 97% to 98% by weight of vinyl chloride and 2% to 3% by weight vinyl acetate with an ethyl silicate, and applying heat and pressure to sinter the mixture of resin and silicate to form said sheet.

5. The method of preparing a permeable microporous sheet as defined in claim 4 wherein the granular copolymer contains about 97% vinyl chloride and wherein the ethyl silicate is present in the proportion of 1–10 parts per 100 parts of copolymer.

References Cited by the Examiner
UNITED STATES PATENTS

| | | | |
|---|---|---|---|
| 2,371,868 | 3/1945 | Berg et al. | 260—36 |
| 2,766,485 | 10/1956 | Jevelot et al. | 18—53 |
| 2,772,322 | 11/1956 | Witt et al. | 136—146 |
| 2,963,746 | 12/1960 | Webb et al. | 264—126 |

MURRAY TILLMAN, *Primary Examiner.*

N. F. OBLON, *Assistant Examiner.*